(12) United States Patent
Billiu

(10) Patent No.: US 6,625,949 B2
(45) Date of Patent: Sep. 30, 2003

(54) METHOD OF MANUFACTURING AUTOMOTIVE TRIM USING VIBRATION WELDING, AND RESULTING ARTICLE

(75) Inventor: Andrew T. Billiu, Farmington Hills, MI (US)

(73) Assignee: Guardian Industries Corp., Auburn Hills, MI (US)

(*) Notice: Subject to any disclaimer, the term of this patent is extended or adjusted under 35 U.S.C. 154(b) by 107 days.

(21) Appl. No.: 09/774,803

(22) Filed: Feb. 1, 2001

(65) Prior Publication Data
US 2002/0100245 A1 Aug. 1, 2002

(51) Int. Cl.[7] .................................................. E04C 2/38
(52) U.S. Cl. ................ 52/716.5; 52/717.03; 52/717.04; 156/73.6; 264/70; 296/70.72; 428/31; 428/36.92
(58) Field of Search .......................... 52/716.5, 716.6, 52/716.7, 717.05, 717.03, 717.06, 717.04; 296/70, 72; 428/31, 99, 133, 36.92; 156/73.6, 73.1, 736, 580; 264/68, 69, 70

(56) References Cited

U.S. PATENT DOCUMENTS

| | | | |
|---|---|---|---|
| 4,146,416 A | 3/1979 | Goldman | |
| 4,154,641 A | 5/1979 | Hotton | |
| 4,190,093 A | 2/1980 | Kearney et al. | |
| 4,601,927 A | 7/1986 | Durfee | |
| 5,092,643 A | 3/1992 | Okamoto et al. | |
| 5,202,172 A | 4/1993 | Graf | |
| 5,207,964 A | 5/1993 | Mauro | |
| 5,264,661 A | * 11/1993 | Luettgen | 174/52.3 |
| 5,340,623 A | 8/1994 | Menjo et al. | |
| 5,421,925 A | * 6/1995 | Kulaszewicz et al. | 156/73.5 |
| 5,494,630 A | 2/1996 | Eraybar et al. | |
| 5,520,765 A | 5/1996 | Zoller | |
| 5,522,954 A | 6/1996 | Bennett et al. | |
| 5,560,175 A | 10/1996 | Soyka, Jr. et al. | |
| 5,633,022 A | 5/1997 | Myers | |
| 5,639,522 A | * 6/1997 | Maki et al. | 428/31 |
| 5,699,950 A | 12/1997 | Jang | |
| 5,725,712 A | 3/1998 | Spain et al. | |
| 5,772,827 A | * 6/1998 | Malm | 156/244.11 |
| 5,786,047 A | 7/1998 | Tomblin | |
| 5,833,915 A | 11/1998 | Shah | |
| 5,846,377 A | 12/1998 | Frantz et al. | |
| 5,874,146 A | 2/1999 | Kagan et al. | |
| 5,902,657 A | 5/1999 | Hanson et al. | |
| 6,000,814 A | * 12/1999 | Nestell et al. | 362/267 |
| 6,089,642 A | * 7/2000 | Davis, Jr. et al. | 296/70 |
| 6,241,836 B1 | * 6/2001 | Skirha et al. | 156/73.5 |
| 6,319,438 B1 | * 11/2001 | Smith et al. | 264/75 |
| 6,364,351 B1 | * 4/2002 | Hier et al. | 280/732 |

* cited by examiner

Primary Examiner—Carl D. Friedman
Assistant Examiner—Yvonne M. Horton
(74) Attorney, Agent, or Firm—Nixon & Vanderhye P.C.

(57) ABSTRACT

A method of manufacturing an automotive trim component/article. Extrusion is utilized to provide a colored and/or metallized sheet. The sheet is vacuum-formed into a three-dimensionally shaped preform or base structure. At least one mounting structure (e.g., formed by small-scale injection molding tooling) is vibration welded to a surface of the preform in order to form the automotive trim component. The invention is applicable to trim components such as bodyside molding, body panels, wheel covers, pillars, and the like.

8 Claims, 5 Drawing Sheets

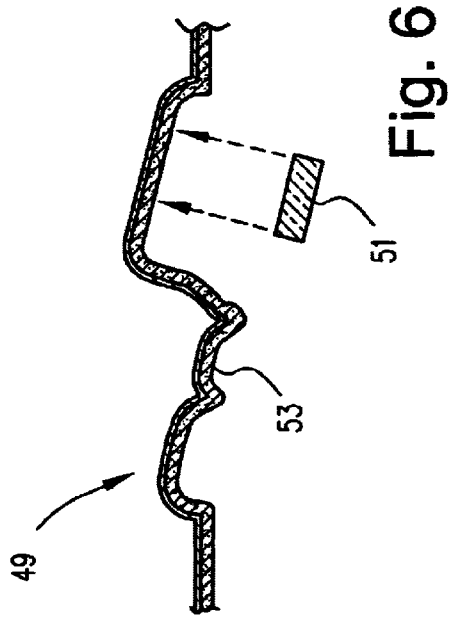
Fig. 6
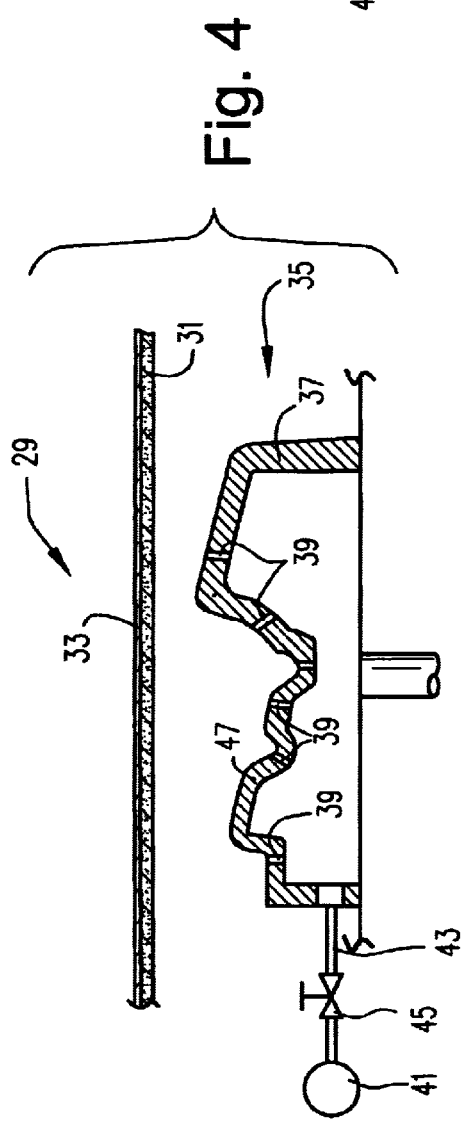
Fig. 4
Fig. 5

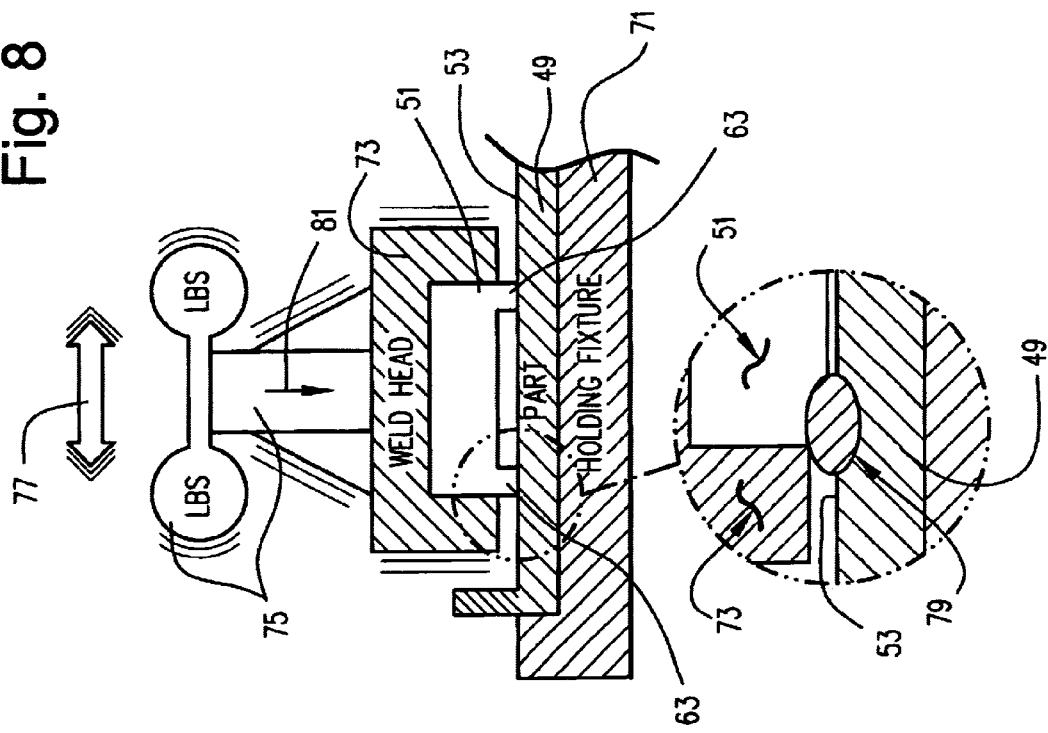
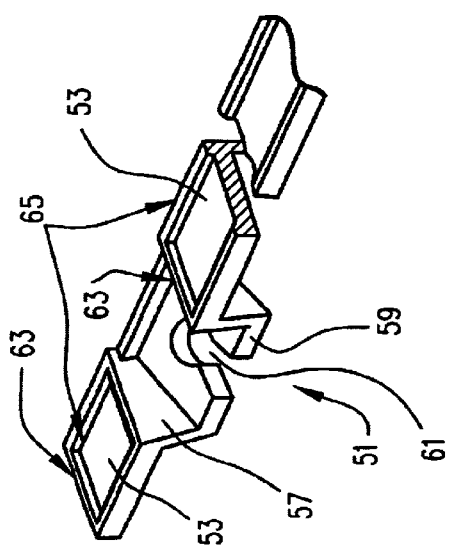
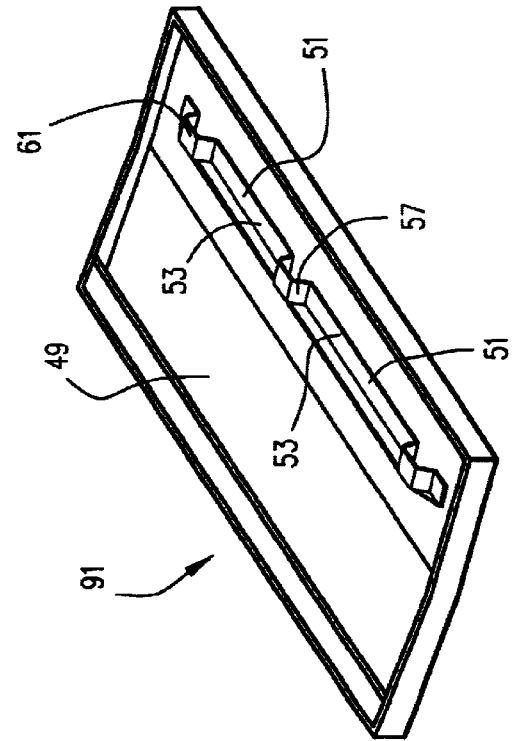

METHOD OF MANUFACTURING AUTOMOTIVE TRIM USING VIBRATION WELDING, AND RESULTING ARTICLE

This invention relates to a method of manufacturing an automotive trim component/article, as well as to the resulting trim component/article itself. More particularly, this invention relates to a method of utilizing vacuum-forming in combination with vibration welding in the manufacture of an automotive trim component/article.

BACKGROUND OF THE INVENTION

It is known to apply automotive trim components (or articles) to the exterior of vehicles such as cars and trucks. Examples of automotive trim components (or articles) include bodyside moldings, bumper covers, claddings, wheel covers, wheel flare moldings, A B C and D pillars, and the like. FIG. 1 illustrates a vehicle 3 including respective doors 5 and 7. Attached to the exterior of vehicle 3 is an automotive trim component in the form of bodyside molding 9.

Automotive trim components have often been manufactured utilizing an injection molding process. In injection molding, semi-molten plastic material is injected into a cavity defined by one or more die(s). The cavity within the die(s) is in the form of the trim component to be manufactured. After the semi-molten plastic material has been injected into the cavity, it is permitted to cool and is thereafter removed from the cavity in the form of an automotive trim component which can be attached to the exterior of a vehicle.

FIG. 2 is an exploded perspective view of a portion of a bodyside molding 9, as illustrated and described in U.S. Pat. No. 5,639,522 (the disclosure of which is hereby incorporated herein by reference). Bodyside molding 9 includes elongated body 11 integrally formed with mounting structure 13. Typically, mounting structure 13 and elongated body 11 are formed in a single injection molding process, so that the mold die defines and allows formation of body 11 and mounting structure 13 simultaneously in one mold cavity. Optionally, T-shaped tab 15 may be utilized in conjunction with mounting structure 13 in order to attach bodyside molding 9 to the exterior of a vehicle via molding 9's interior side 17.

Unfortunately, it is not always desirable to manufacture bodyside moldings using an injection molding process. Large scale injection molding devices (i.e., tooling) are very costly and often can be burdensome. Moreover, color pigment and/or metallizing particles in the semi-molten material may not be as uniformly distributed as would be desired when sharp corners and/or walls are required to be formed in an injection molding cavity.

It is also known to form automotive trim components using vacuum forming techniques. U.S. Pat. No. 5,725,712 discloses the use of vacuum forming in the manufacture of a plastic automotive body panel.

Unfortunately, it is very difficult to manufacture a bodyside molding such as that illustrated in FIG. 2 using vacuum forming, because mounting structure 13 projects outwardly from the interior surface of the molding component at a large angle (i.e., there is no flow of molten plastic material in vacuum forming). In other words, it is not practical to utilize vacuum-forming to manufacture a product such as that shown in FIG. 2 where one or more projections extend outwardly at a large angle (e.g., from about 70–110°) from the surface of the component.

U.S. Pat. No. 5,092,643 (the disclosure of which is hereby incorporated herein by reference) discloses an automotive bumper. The bumper includes a mount structure vibration welded to an injection molded body. Unfortunately, the '643 patent does not recognize the problems associated with large scale injection molding tooling and/or processes. It is undesirable to utilize large scale injection molding tooling for at least the cost reasons discussed above.

In view of the above, it will be apparent to those skilled in the art that there exists a need for a method of manufacturing an automotive trim component (or article) including a protruding mounting structure thereon, wherein the use of large scale injection molding tooling can be avoided. There also exists a need in the art for a method of manufacturing an automotive trim component (or article) utilizing a vacuum forming technique, wherein mounting structures and the like may be efficiently attached to the component following the vacuum forming process.

SUMMARY OF THE INVENTION

It is an object of this invention to manufacture an automotive trim component (or article) without the need for utilizing large scale injection molding tooling. The use of small scale injection molding tooling may be desirable in certain embodiments of this invention, but an object is to avoid the use of large scale injection molding tooling for the forming of entire trim components/articles.

Another object of this invention is to provide a method of manufacturing an automotive trim component using at least a vacuum-forming process, wherein a mounting structure can be efficiently attached to a vacuum-formed base.

Another object of this invention is to manufacture an automotive trim component using vacuum-forming in combination with vibration welding.

Another object of this invention is to manufacture a automotive trim component by at least: 1) vacuum forming a base, 2) injection molding a mounting structure, and 3) using vibration welding to attach the injection molded mounting structure to the vacuum formed base.

Another object of this invention is to fulfill one or more of the above listed needs and/or objects.

Certain embodiments of this invention fulfill one or more of the aforesaid needs and/or objects by providing a method of manufacturing an automotive trim component, the method comprising the steps of:

extruding a colored and metallized sheet having one or more layers;

vacuum-forming the colored and metallized sheet into a three dimensionally shaped preform; and vibration welding a mounting structure to a surface of the three dimensionally shaped preform in order to form an automotive trim component.

BRIEF DESCRIPTION OF THE DRAWINGS

FIG. 4 is a side cross-sectional view of a step of a vacuum forming process according to an embodiment of this invention.

FIG. 5 is a side cross-sectional view of a further step in the vacuum forming process.

FIG. 6 is a side cross-sectional and partial exploded view of a generic mounting structure which is to be attached to a vacuum formed base structure according to an embodiment of this invention.

FIG. 7 is a perspective and partial cross-sectional view of the mounting structure of FIG. 6 (in more detail than in FIG. 6).

FIG. 8 is a side cross-sectional including a partially enlarged view illustrating the FIG. 7 mounting structure being attached to the vacuum formed base structure (or part) by vibration welding.

FIG. 9 is a perspective view of a final automotive trim component/article made using the process of FIGS. 3–8.

DETAILED DESCRIPTION OF CERTAIN EMBODIMENTS OF THIS INVENTION

Figure 1:
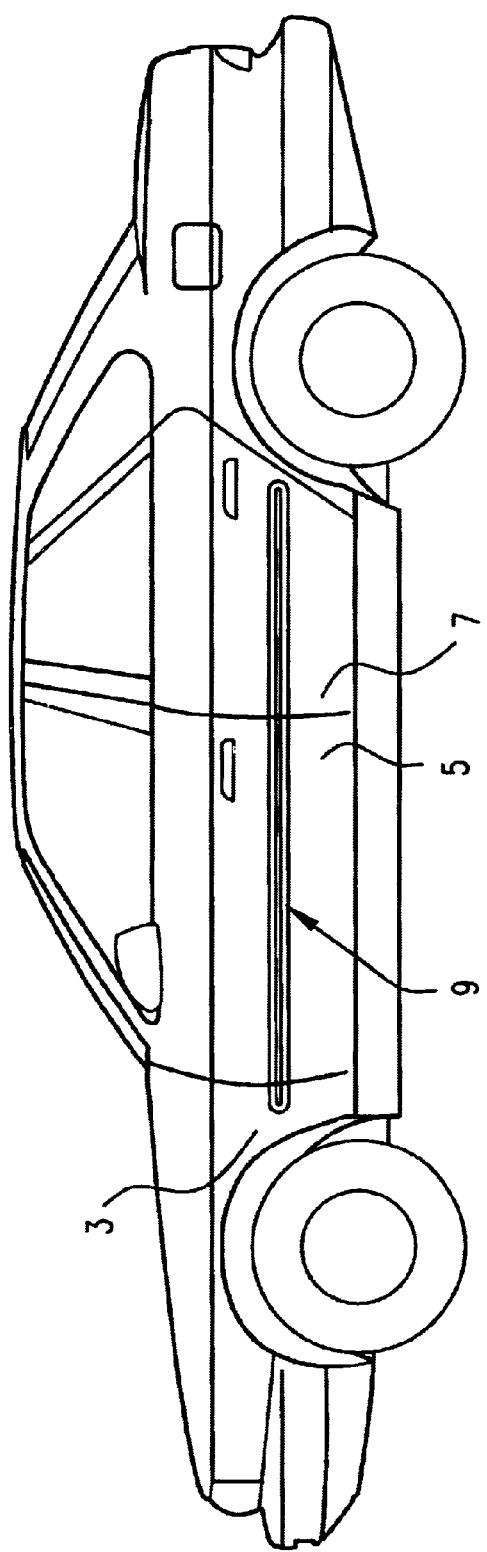
FIG. 1 is a side plan view of a vehicle with a bodyside molding thereon.
Figure 2:
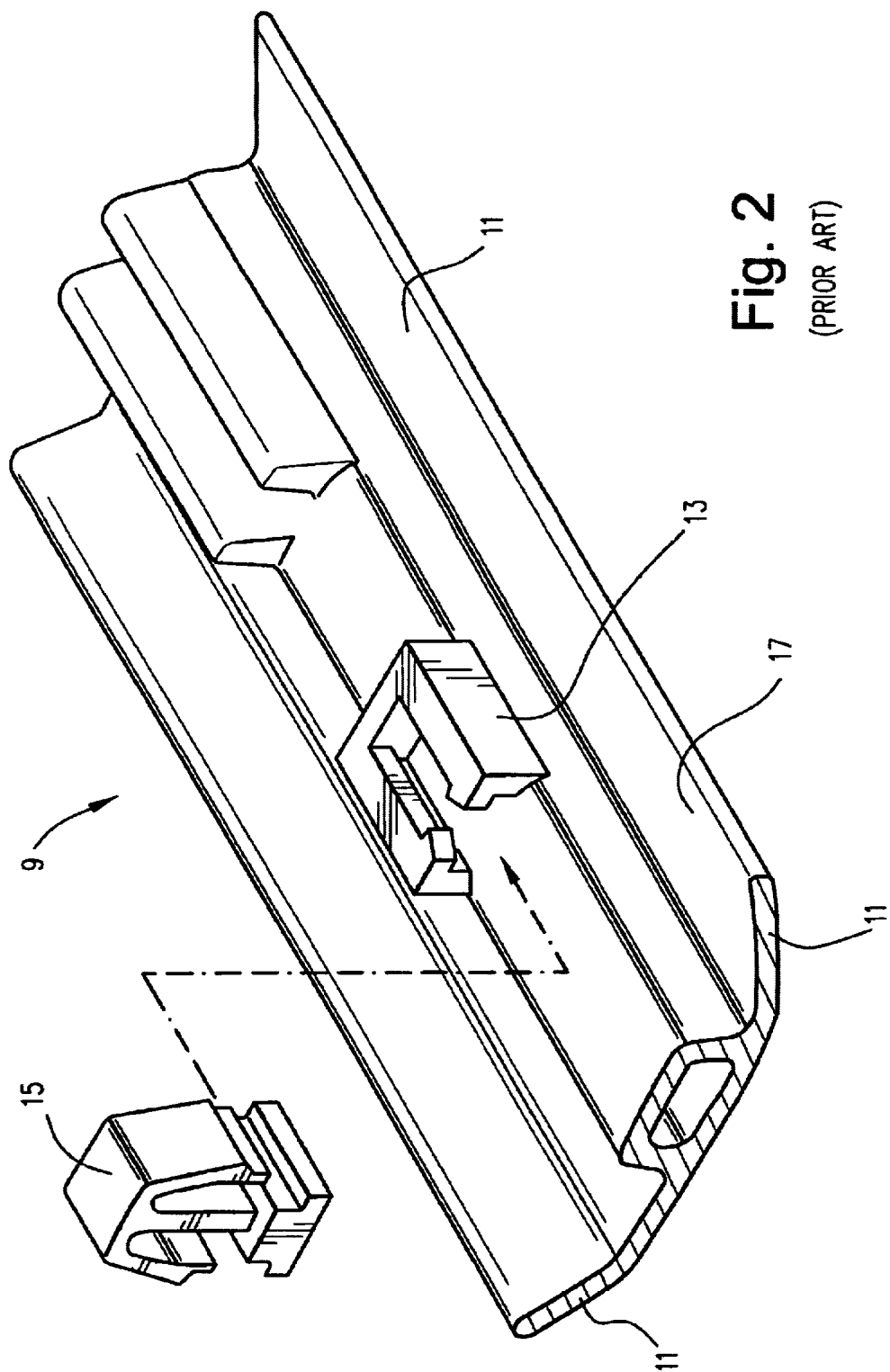
FIG. 2 is an exploded perspective view of a portion of a conventional bodyside molding component/article.

In the following description, for purposes of explanation and not limitation, specific details are set forth in order to provide an understanding of certain embodiments of the present invention. However, it will be apparent to those skilled in the art that the present invention may be practiced in other embodiments that depart from these specific details. In other instances, detailed descriptions of well known devices, processes, techniques, and methods are omitted so as to not obscure the description with unnecessary detail. Referring now more particularly to the accompanying drawings, in which like reference numerals indicate like parts/elements throughout the several views.

According to an exemplary embodiment of this invention, an automotive trim component or article (e.g., bodyside molding, cladding, wheel cover, body panel, pillar, etc.) is manufactured as follows. An approximately flat or planar sheet of colored and/or metallized plastic is provided. This sheet may be formed by extrusion (including extrusion of a single layer, or extrusion of multiple layers via e.g., coextrusion) or any other suitable technique. The sheet is vacuum-formed into a three dimensionally shaped base structure (i.e., a preform). Meanwhile, a mounting structure which is to be attached to the vacuum-formed base structure is provided. The mounting structure may be manufactured by any suitable technique (e.g., small scale injection molding). Vibration welding is then utilized to attach the mounting structure to the vacuum-formed base structure, thereby resulting in the automotive trim component/article which is to be attached to the exterior of a vehicle. While the primary focus of this invention relates to automotive trim components that are to be attached to the exterior of vehicles, it will be recognized by those skilled in the art that other automotive components (e.g., to be attached to the interior of a vehicle) may also be made in accordance with alternative embodiments of this invention).

Figure 3:
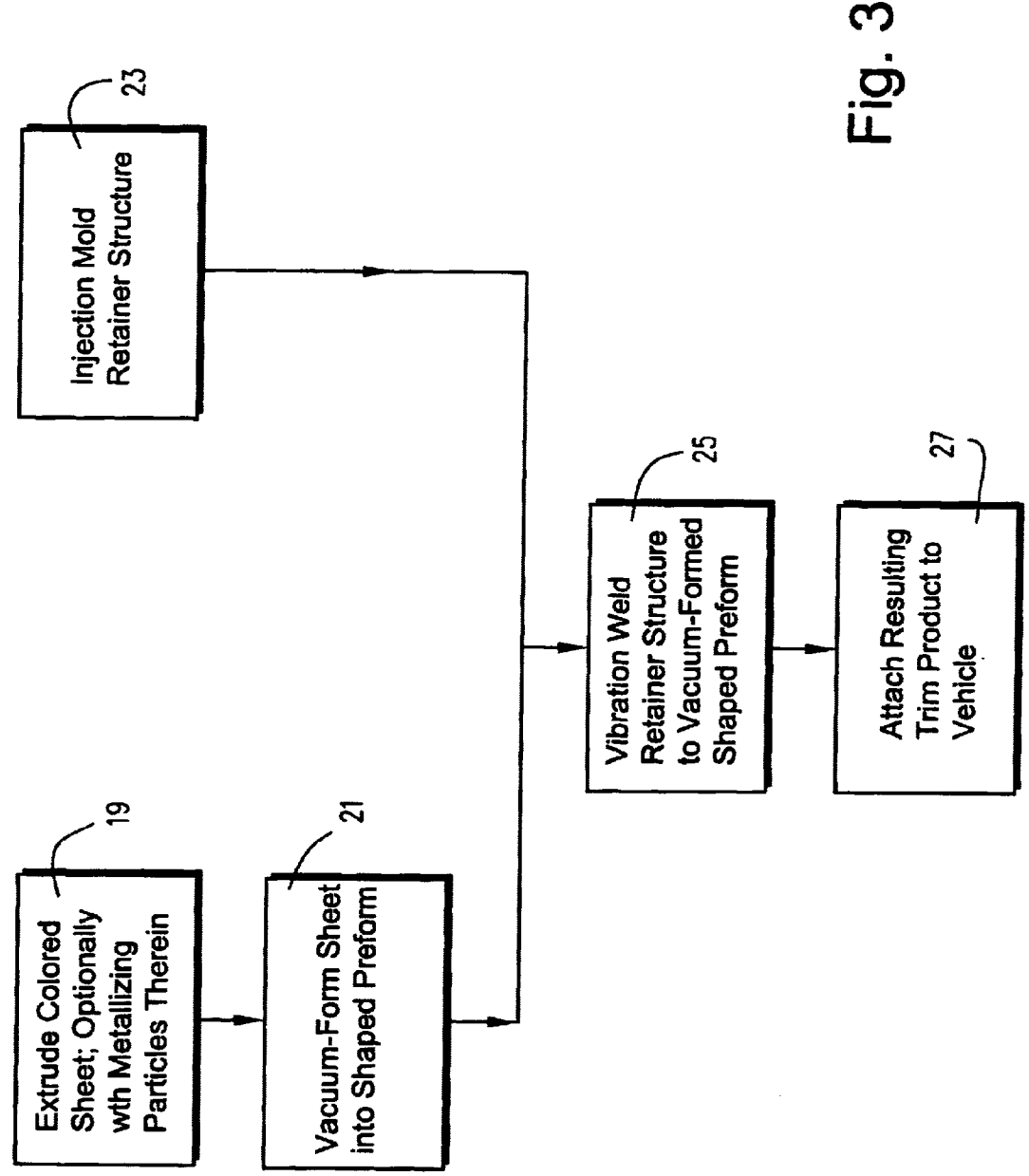
FIG. 3 is a flowchart illustrating certain steps taken in the manufacture of an automotive trim component/article according to an embodiment of this invention.

FIG. 3 is a flowchart illustrating certain steps taken in a process according to an embodiment of this invention. In step 19, a sheet is extruded. The sheet is preferably flat or planar, but may be curved in alternative embodiments. This sheet may be colored and/or metallized in certain embodiments of this invention. Optionally, a substantially transparent clear coat may be co-extruded along with the colored and/or metallized portion of the sheet. This sheet is vacuum-formed in step 21 into a three dimensionally shaped base structure (i.e., into a non-flat preform with curve(s) and/or angle(s)). In step 23, a mounting or retainer structure to be attached to the vacuum formed base is made (e.g., by small scale injection molding). Then, the two pieces resulting from steps 21 and 23 are attached to one another by vibration welding in step 25. The automotive trim component/article formed in step 25 may then be attached to a vehicle in a known manner in step 27.

In order to more fully explain and/or describe certain embodiments of this invention, reference is now made to the remaining figures.

FIG. 4 illustrates a substantially planar sheet 29 having one or more layers formed by an extrusion process. Sheet 29 may include, for example and without limitation, colored and/or metallized layer 31. Substantially transparent clear coat layer 33 is optional (when provided, the two layers 31, 33 are preferably formed using a coextrusion process). The co-extrusion techniques described in Ser. No. 09/416,888, filed Oct. 13, 1999 (hereby incorporated herein by reference) may be utilized in order to coextrude sheet 29.

Layer 31, which preferably includes both color pigment and metallizing particles, determines the color of the resulting trim component. Layer 31, in certain embodiments, may be of or include a polyolefinic thermoplastic resin (e.g., TPO) including color producing pigment and/or additives, ultraviolet stabilizers, and/or other additives conventionally used in thermoplastic resins for producing automotive exterior components. In addition to TPO, other materials which may be utilized for layer 31 include polyethylene, polypropylene, PVC, nylon, surlyn, ionomer resin, polycarbonate, a mixture of polycarbonate and ABS, or the like.

Metallizing particles within layer 31 may be any which can provide a finish with metallic glamour. These include conventional metallic flake pigment, such as aluminum flake, nickel flake, nickel-chrome flake, as well as other known flake materials such as mica that can be used to metallize the appearance of the finish for a trim component. The metallizing particles in layer 31 are preferably added during the extrusion process as part of the resin pellets, or alternatively within pellets or other carriers of their own, so that the metallizing particles can be approximately consistently distributed or spread throughout layer 31 during the extrusion process. In certain embodiments of this invention, the resulting layer 31 of sheet 29 includes at least about 5 metallizing particles per square inch view area that are at partially visible to the naked eye, more preferably at least about 10 metallizing particles per square inch view area, and most preferably at least about 20 such particles per square inch view area.

During the extrusion process, most of the metallizing particles and color pigment material in layer 31 are approximately evenly distributed throughout the layer. However, many of the metallizing particles tend to become oriented in the same or different directions throughout the layer in order to provide a uniform or random appearance depending upon the application.

Optional one or more clear coat layer(s) 33 are at least about 90% transparent to visible light, more preferably at least about 95% transparent, and most preferably at least about 98% transparent. Optionally, layer 33 may include color pigment material in certain embodiments. Layer 33 may be provided in order to give the resulting component a high gloss finish, protection to the underlying layer(s), and/or a coating resistant to scratching, marring, heat, UV radiation, and/or weathering. Layer 33 may be, for purposes of example only and without limitation, of or include a thermoplastic synthetic resinous composition (e.g., a blend of a thermoplastic fluorinated polymer and an acrylic resin where the polymer may be a thermoplastic fluorocarbon and the acrylic resin may be polymethyl methacrylate or polyethyl methacryate resin, or mixtures thereof. A surlyn inclusive ionomer may also be used for layer 33, as may any suitable polycarbonate based material.

Still referring to FIG. 4, co-extruded colored and/or metallized sheet 29 is brought into proximity of vacuum forming apparatus/device 35. Vacuum forming device 35 includes vacuum molding buck or die 37, a plurality of vacuum suction holes 39 in die 37, and vacuum suction pump 41 which communicates with holes 39 via conduit 43. On/off valve 45 may be provided so that vacuum pump 41 may selectively vacuum air through holes 39 in order to thermoform sheet 29 against die 37.

Sheet 29 is soften by heating it to a preheating temperature at the initiation of the vacuum forming process. Following preheating, buck or die 37 may be raised toward is sheet 29 and/or vacuum applied to holes 39 in order to draw the sheet 29 into contact with the working surface 47 of die 37 (see FIG. 5). Thus, sheet 29 is three dimensionally shaped into the base structure or preform 49 illustrated in FIG. 6, due to the vacuum force provided through holes 39. Preform or base 49 may have a contour or shape of a significant portion of the intended final trim component/article.

Base structure or preform 49 is illustrated in FIG. 6 in just one of many different shapes which may be utilized for a trim component according to this invention. Thus, the shape of FIG. 6 is not limiting. Sheet 29 may be vacuum-formed into any suitable shape of any desired automotive trim component. Shapes herein are provided for purposes of example only.

Referring to FIG. 6, once base structure or preform 49 has been formed via vacuum forming, mounting or retainer structure 51 (illustrated in FIG. 6 as planar for purposes of simplicity only; an exemplary mounting structure is shown in more detail in FIGS. 7–9) is to be attached to an interior surface 53 thereof.

FIG. 7 is a partial cut-away perspective view (as viewed from a bottom angle) of an exemplary mounting or retainer structure 51 to be attached to the vacuum-formed base 49. As illustrated, mounting structure 51 may include a plurality of spaced apart respective base portions 53, and a plurality of protruding walls or ramps 57 which lead to apex structure(s) 59. Each apex structure(s) includes at least one mounting aperture 61 defined therein for receiving a male mounting element (not shown). Walls 57 preferably extend so as to form an angle of from about 70–140 degrees with adjacent base portions 53. Preferably, the male mounting element adapted to fit within aperture 61 is to be attached to the vehicle to which the trim component is to be attached (i.e., so that the resulting trim component can be attached to the vehicle). Additionally, welding ribs 63 and 65 (extending in respective orthogonal or transverse directions) may extend downwardly (e.g., at approximately 90° angle(s)) from base portions 53. Ultimately, ribs 63, 65 are to be utilized in order to attach mounting structure 51 to base 49 via vibration welding.

FIG. 8 illustrates a vibration welding process used for attaching mounting structure 51 to the interior surface 53 of base or preform 49. As illustrated, the vibration welding device or apparatus includes holding fixture 71 upon which base 49 is mounted, weld head 73 upon which mounting structure 51 is mounted, and pressure/vibration member 75 for applying downward pressure 81 on weld head 73 and thus also on mounting structure 51 while applying vibration 77; in order to cause mounting structure 51 and base 49 to become vibration welded to one another via ribs 63, 65. An exemplary weld 79 is shown in the enlarged portion of FIG. 8, the weld 79 being between a rib 63 of mounting structure 51 and the interior surface 53 of base 49.

According to certain embodiments of this invention, the side-to-side vibration 77 may be performed at 0.070 inch intervals at a frequency of about 240 Hz for three to four seconds. This vibration, along with downward pressure 81 at a force of from about 1400–1800 pounds, more preferably about 1600 pounds, causes the mounting structure 51 to become welded to base 49. These frequency and pressure parameters are provided for purposes of example only and are not intended to be limiting.

FIG. 9 is a perspective view of a final automotive trim component 91 including an elongated mounting structure 51 vibration welded to the interior surface of base 49. This component 91 may be used, for example, as a vehicle bodyside molding or any other suitable trim component as discussed herein. Upon attachment to a vehicle, plastic or metal male mounting structure elements (not shown) are inserted into respective apertures 61 of mounting structure 51 in order to ensure attachment of the trim component to the vehicle in a known manner.

While the invention has been described in connection with what is presently considered to be the most practical and preferred embodiments, it is to be understood that the invention is not to be limited to the disclosed embodiments. To the contrary, the invention is intended to cover various modifications and equivalent arrangements included within the spirit and scope of the appended claims.

What is claimed is:

1. A method of manufacturing an automotive trim component, the method comprising:

extruding a polymer inclusive colored sheet including metallizing particles therein and having one or more layers;

vacuum-forming the polymer inclusive colored sheet into a three dimensionally shaped preform;

vibration welding a mounting structure to a surface of the three dimensionally shaped preform in order to form an automotive trim component; and wherein the mounting structure includes first and second base portions and an apex portion including at least one aperture defined therein.

2. The method of claim 1, further comprising forming the mounting structure utilizing at least an injection molding process.

3. A method of manufacturing an automotive trim component, the method comprising:

extruding a polymer inclusive colored sheet including metallizing particles therein and having one or more layers;

vacuum-forming the polymer inclusive colored sheet into a three dimensionally shaped preform;

vibration welding a mounting structure to a surface of the three dimensionally shaped preform in order to form an automotive trim component; and wherein the mounting structure includes at least one rib used in forming a weld between the mounting structure and the preform.

4. A method of manufacturing an automotive trim component, the method comprising:

extruding a polymer inclusive colored sheet including metallizing particles therein and having one or more layers;

vacuum-forming the polymer inclusive colored sheet into a three dimensionally shaped preform;

vibration welding a mounting structure to a surface of the three dimensionally shaped preform in order to form an automotive trim component; and wherein the mounting structure includes first and second base portions, first and second angled portions extending from the first and second base portions, respectively, and an apex portion with an aperture defined therein, and wherein the apex portion is at least partially located between respective portions of said first and second angled portions.

5. An automotive trim component comprising:

a vacuum-formed polymer inclusive colored three dimensionally shaped preform having one or more layers;

a mounting structure vibration welded to a surface of the three dimensionally shaped preform; and wherein the mounting structure includes first and second base portions, first and second angled portions extending from the first and second base portions, respectively, and an apex portion with an aperture defined therein, and wherein the apex portion is at least partially located between respective ends of said first and second angled portions, and wherein at least one of the angled portions defines an angle of from about 70–140 degrees with a base portion directly connected to the at least one angled portion.

6. An automotive trim component comprising:

a vacuum-formed colored and metallized three dimensionally shaped preform having one or more layers;

a mounting structure vibration welded to a surface of the three dimensionally shaped preform; and wherein the mounting structure includes at least one rib used in forming a weld between the mounting structure and the preform.

7. The trim component of claim 6, wherein the mounting structure is an injection molded mounting structure.

8. An automotive trim component comprising:

a colored three dimensionally shaped preform having one or more layer;

a mounting structure vibration welded to a surface of the three dimensionally shaped preform; and wherein the mounting structure includes at least one rib used in forming a weld between the mounting structure and the preform.

* * * * *